US009119160B2

(12) United States Patent  (10) Patent No.: US 9,119,160 B2
Hall et al.  (45) Date of Patent: Aug. 25, 2015

(54) OPTIMIZATION OF NFC TAG FOR DIFFERENT BATTERY LEVELS

(75) Inventors: Steven Hall, Olivenhain, CA (US); Mohamed Awad, Ladera Ranch, CA (US); Theodore Trost, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 372 days.

(21) Appl. No.: 13/250,356

(22) Filed: Sep. 30, 2011

(65) Prior Publication Data

US 2013/0084803 A1  Apr. 4, 2013

(51) Int. Cl.
*H04B 5/00* (2006.01)
*H04W 24/00* (2009.01)
*H02J 7/00* (2006.01)
*G06F 1/00* (2006.01)
*H04W 52/02* (2009.01)

(52) U.S. Cl.
CPC ......... *H04W 52/0277* (2013.01); *H04B 5/0037* (2013.01); *H04B 5/0075* (2013.01); *H04W 52/028* (2013.01); *Y02B 60/50* (2013.01)

(58) Field of Classification Search
USPC ............... 455/41.1; 320/124, 137, 127, 132
See application file for complete search history.

(56) References Cited

U.S. PATENT DOCUMENTS

| | | | |
|---|---|---|---|
| 7,610,495 B2* | 10/2009 | Azadet et al. | 713/300 |
| 2006/0132302 A1* | 6/2006 | Stilp | 340/539.22 |
| 2007/0004469 A1* | 1/2007 | Arimitsu | 455/574 |
| 2007/0188144 A1* | 8/2007 | Hara et al. | 320/132 |
| 2008/0200220 A1* | 8/2008 | Jackson | 455/574 |
| 2009/0312046 A1* | 12/2009 | Clevenger et al. | 455/522 |
| 2010/0279606 A1* | 11/2010 | Hillan et al. | 455/41.1 |
| 2010/0323616 A1* | 12/2010 | Von Novak et al. | 455/41.1 |
| 2011/0143805 A1* | 6/2011 | Ramasamy et al. | 455/522 |
| 2012/0264374 A1* | 10/2012 | Perkins et al. | 455/41.1 |
| 2012/0302163 A1* | 11/2012 | Kitchen | 455/41.1 |
| 2013/0005241 A1* | 1/2013 | Ochikubo | 455/41.1 |
| 2013/0005245 A1* | 1/2013 | Royston | 455/41.1 |

* cited by examiner

*Primary Examiner* — Edward Urban
*Assistant Examiner* — Ralph H Justus
(74) *Attorney, Agent, or Firm* — Sterne, Kessler, Goldstein & Fox P.L.L.C.

(57) ABSTRACT

A mobile communication device has a processor, a radio, a near field communication (NFC) device, a battery, and memory for storing data. The power level of the battery is measured. When the measured power level is above a first predetermined level, power is provided to the radio to allow communication. Sufficient power is provided to operate the NFC device as a reader and a tag. When the measured power level of the battery falls below the first predetermined level, battery power to the radio is shut off. Sufficient power is maintained to the NFC device to allow it to operate only as a tag. Sufficient power is maintained to the memory to retain the data stored in the memory. When the measured power level of the battery falls below a second predetermined level, the NFC device is required to harvest all of its power from the field.

16 Claims, 4 Drawing Sheets

OPTIMIZATION OF NFC TAG FOR DIFFERENT BATTERY LEVELS

BACKGROUND

1. Field of the Invention

The present invention relates generally to near field communications.

2. Background Art

Near field communication, or NFC, is a set of short-range wireless technologies, typically requiring a distance of 4 cm or less. NFC generally operates at 13.56 MHz and at rates ranging from about 106 kbit/s to 848 kbit/s. NFC generally involves a reader (or initiator) and a tag (or target); the reader actively generates an RF field that can power a passive tag. This enables NFC tags to be configured so as to have very simple form factors such as tags, stickers, key fobs, or cards that do not require batteries. NFC peer-to-peer communication is of course possible, where both devices are powered. Devices that contain both reader and tag capabilities are often called controllers.

Near field communications (NFC) devices can be integrated into mobile devices, such as smartphones, for example, to facilitate the use of these mobile devices in conducting daily transactions. For example, instead of carrying numerous credit cards, the credit information provided by these credit cards could be stored onto a NFC device. The NFC device is simply tapped to a credit card terminal to relay the credit information to it to complete a transaction. As another example, ticket writing systems, such as those used in bus and train terminals, may simply write ticket fare information onto the NFC device instead of providing a paper ticket to a passenger. The passenger simply taps the NFC device to a reader to ride the bus or the train without the use of a paper ticket.

Generally, NFC requires that NFC devices be present within a relatively close proximity to each other so that their corresponding magnetic fields can exchange information. Typically, a first NFC device transmits or generates a magnetic field modulated with the information, such as the credit information or the ticket fare information. This magnetic field inductively couples onto a second NFC device that is proximate to the first NFC device. The second NFC device may respond to the first NFC device by transmitting or generating its own modulated magnetic field and inductively coupling this magnetic field to the first NFC device.

Mobile communication devices, such as smartphones, tablet computers, notebook computers, and the like, are generally battery powered. The battery in these devices has a finite life before it requires recharging. Manufacturers of mobile devices that incorporate NFC devices generally want them to be able to operate as card emulators. In card emulation mode, the mobile device can take the place of a credit or debit card to make purchases or perform other financial tasks that cards can normally accomplish. In addition, in card emulation mode, the mobile device may be used to access transportation systems, allowing a user to enter and/or exit a subway or bus system, for example. It is desirable to incorporate features into the mobile communication devices that will allow them to operate in card emulation mode even when they cannot be used to make or receive calls or access the Internet.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION

Figure 1:
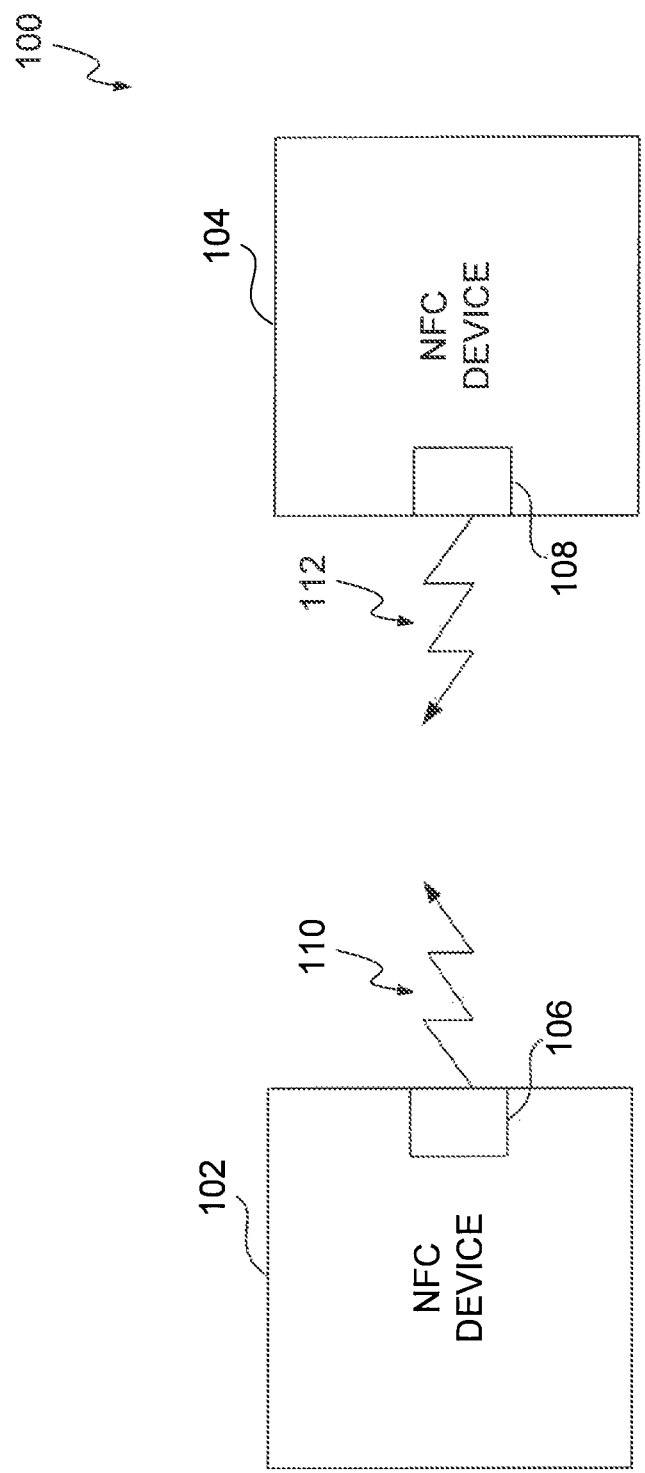
FIG. 1 shows a block diagram of an NFC environment.

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although, the description of the present invention is to be described in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

FIG. 1 illustrates a block diagram of a NFC environment 100 according to an exemplary embodiment. NFC environment 100 provides wireless communication of information among a first NFC device 102 and a second NFC device 104 that are closely proximate to each other (typically between 0 cm and 4 cm spacing). The information may include one or more commands to be executed by the first NFC device 102 and/or the second NFC device 104, data from one or more data storage devices that is to be transferred to the first NFC device 102 and/or the second NFC device 104, or any combination thereof. The data storage devices may include one or more contactless transponders, one or more contactless tags, one or more contactless smartcards, or any other machine-readable media that will be apparent to those skilled in the relevant art(s) without departing from the spirit and scope of the invention, or any combination thereof. The other machine-readable media may include, but are not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples.

NFC devices 102 and 104 may be any of three types of devices. One type is a tag, or target. A tag is passive. A tag contains data or commands. When brought into communication with another device, the tag transfers data and/or commands to the second device. As one example, a tag may be an ID card that permits access to a building when the data stored on the tag is read. A second type is a reader, or initiator. A reader generates an electromagnetic field which is modulated by a tag. An example of a reader may be the unit mounted on the building wall that reads the information stored in the tag. The reader reads data stored on the tag and may take action based on the received information. A controller is a device that incorporates features of both a tag and a reader. A controller typically has more "intelligence" than a tag. That is, a controller may handle more computational and operational functions than a tag. A controller may act as a tag, or a reader, or both. For purposes of the present disclosure, a tag, a reader, and a controller will be referred to herein individually and collectively as a "NFC device."

The first NFC device 102 and/or the second NFC device 104 may be implemented as a standalone or a discrete device or may be incorporated within or coupled to larger electrical devices or host devices such as mobile telephones, portable computing devices, other computing devices such as personal, laptop, tablet, or desktop computers, computer peripherals such as printers, portable audio and/or video players, television receivers, a payment system, ticket writing systems such as parking ticketing systems, bus ticketing systems, train ticketing systems or entrance ticketing systems to provide some examples, or in ticket reading systems, toys, games, posters, packaging, advertising materials, product inventory checking systems and/or any other suitable electronic device that will be apparent to those skilled in the relevant art(s) without departing from the spirit and scope of the invention.

The first NFC device 102 and/or the second NFC device 104 interact with each other to exchange information such as data and/or one or more commands to be executed by the first NFC device 102 and/or the second NFC device 104. Each NFC device 102 and 104 contains an antenna 106 and 108, respectively, to enable NFC devices 102 and 104 to communicate with each other. One example of such communications is a peer (P2P) communications mode or a reader/writer (R/W) communications mode. In the P2P communications mode, the first NFC device 102 and the second NFC device 104 may be configured to operate according to an active communications mode and/or a passive communications mode. The first NFC device 102 modulates first information onto a first carrier wave, referred to as a modulated data communication, and generates a first magnetic field by applying the modulated data communications to the first antenna 106 to provide a first data communications 110. The first NFC device 102 ceases to generate the first magnetic field after transferring the first information to the second NFC device 104 in the active communications mode via the second antenna 108. Alternatively, in the passive communications mode, the first NFC device 102 continues to apply the first carrier wave without the first information, referred to as an unmodulated data communication, to continue to provide the first data communications 110 once the first information has been transferred to the second NFC device 104.

In the P2P communication mode, the first NFC device 102 is sufficiently closely proximate to the second NFC device 104 that the first data communications 110 is inductively coupled onto the second antenna 108 of the second NFC device 104. The second NFC device 104 demodulates the first data communications 110 to recover the first information. The second NFC device 104 may respond to the first information by modulating second information onto a second carrier wave and generating a second magnetic field by applying this modulated data communications to the second antenna 108 to provide a second modulated data communications 112 in the active communications mode. Alternatively, the second NFC device 104 may respond to the first information by modulating the first carrier wave that is inductively coupled onto the second antenna 108 with the second information to provide the second modulated data communications 112 in the passive communications mode.

In the R/W communications mode, the first NFC device 102 is configured to operate in an initiator, or reader, mode and the second NFC device 102 is configured to operate in a target, or tag, mode. This example is not limiting. Those skilled in the relevant art(s) will recognize that the first NFC device 102 may be configured to operate in the tag mode and the second NFC device 104 may be configured to operate in the reader mode in accordance with the teachings herein without departing from the spirit and scope of the present invention. The first NFC device 102 modulates the first information onto the first carrier wave and generates the first magnetic field by applying the modulated data communications to the first antenna 106 to provide the first data communications 110. The first NFC device 102 continues to apply the first carrier wave without the first information to continue to provide the first data communications 110 once the first information has been transferred to the second NFC device 104. The first NFC device 102 is sufficiently closely proximate to the second NFC device 104 that the first data communications 110 is inductively coupled onto the second antenna 108 of the second NFC device 104.

The second NFC device 104 derives or harvests power from the first data communications 110 to recover, to process, and/or to provide a response to the first information. The second NFC device 104 demodulates the first data communications 110 to recover the first information. The second NFC device 104 processes the first information. The second NFC device 104 may respond to the first information by modulating the second information onto the second carrier wave and generating the second magnetic field by applying this modulated data communications to the second antenna 108 to provide the second modulated data communications 112.

Further operations of the first NFC device 102 and/or the second NFC device 104 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

The present disclosure is directed to the most efficient use of battery power in a mobile communication device which operates in card emulation mode. Disclosed embodiments find particular utility in situations where it is desired to optimize battery life for the NFC device. Handset carriers (e.g., mobile phone providers) desire to have mobile devices that have various power levels of operation, from full power that allows the user to make calls, access the Internet, send and receive e-mail, send and receive text messages, etc., down to a minimal power state that maintains memory and still allows the mobile device to emulate a card, such as, but not limited to, a credit card, a debit card, a transportation system access card, etc. The operations described herein can be performed by hardware, software, or a combination of hardware and software.

Figure 2:
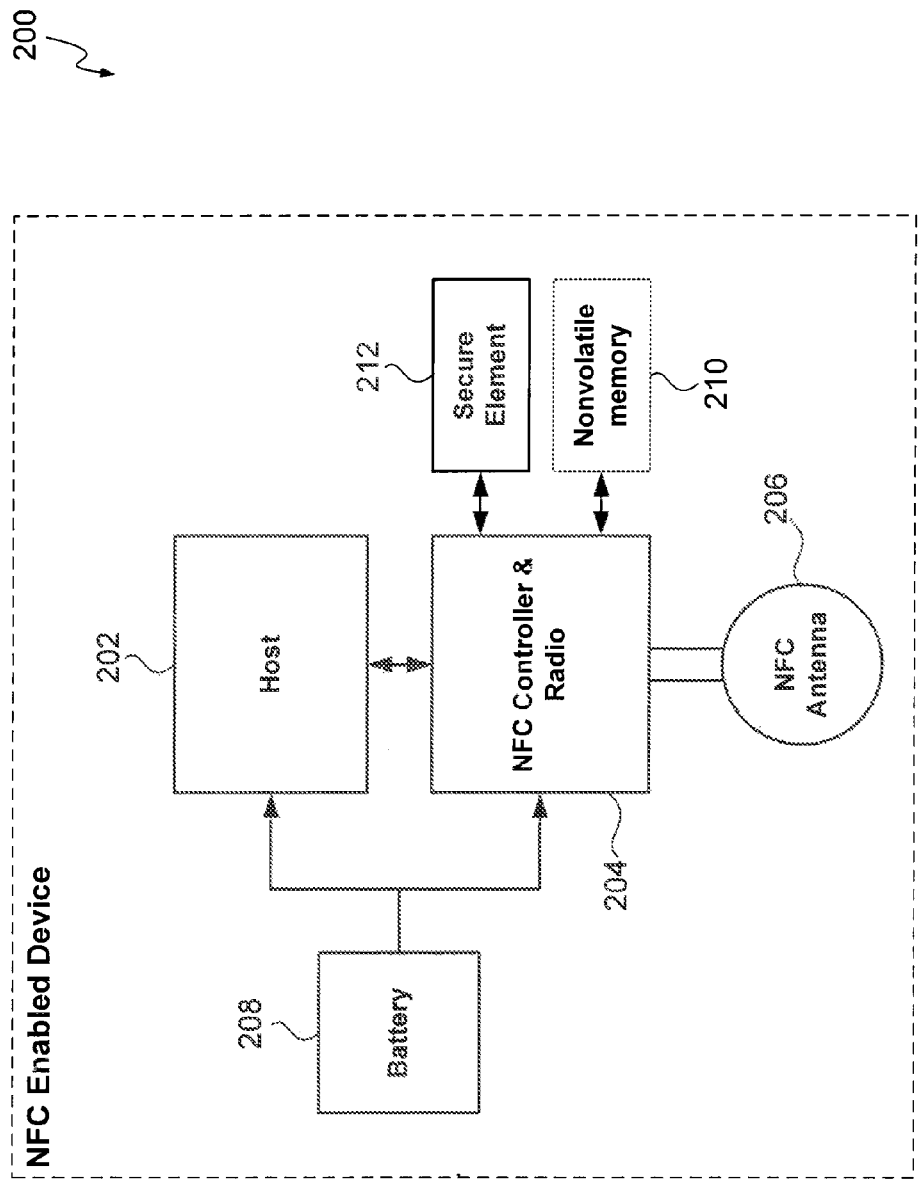
FIG. 2 shows an exemplary embodiment of a mobile communication device containing a NFC device as described herein.

FIG. 2 shows a block diagram of a mobile device 200 of the type to which this invention is directed. Mobile device 200, such as a smartphone or the like, contains a host 202, which includes a Central Processing Unit (CPU) or the "brains" of mobile device 200. Host 202 is electrically coupled to a NFC controller and radio 204. NFC controller 204 transmits and receives data via a NFC antenna 206 and the telecommunications circuitry of mobile device 200. Together, NFC controller 204 and its associated NFC antenna 206 comprise a "NFC device." A battery 208 supplies power to all of the electrical circuits, including, but not limited to CPU 202, the NFC device, and the radio circuit. The NFC device monitors the power levels of battery 208 and controls certain operations of the mobile device based on the detected or measured battery power level, as will be described in more detail below.

Mobile device 200 may also include one or more types of memory. One type is a non-volatile memory device 210 that does not require constant battery power to retain data. A second type is a secure memory element 212 that is powered by battery 208 directly or through the NFC device. Both non-volatile memory 210 and secure memory element 212 can hold secure information, such as passwords, credit and/or debit card numbers, transportation access numbers, and the like. If mobile device 200 includes non-volatile memory 210 to store the secure information, there is no need for secure element 212. If mobile device does not contain non-volatile memory 210, it will include a secure element (or "keep alive memory") 212, which draws very little power from battery 208. Secure element 212 replaces non-volatile memory 210 and contains the secure information or "personalized data" of the user. If mobile device 200 contains non-volatile memory 210, there is essentially no reason to include low power mode secure element 212.

The use of secure element 212 is of particular interest to mobile phone manufacturers. Secure element 212 draws very little power from battery 208 (on the order of several μamps). Even when battery power is so low that mobile device 200 is effectively turned off and the NFC device must operate in field power mode, there will likely be sufficient battery power available to maintain power to secure element 212 for several days and keep the information stored in secure element 212 alive until the user can recharge the battery. The "keep alive" memory or secure element 212 can be used in place of non-volatile memory 210 at a fraction of the cost of non-volatile memory 210.

Figure 3:
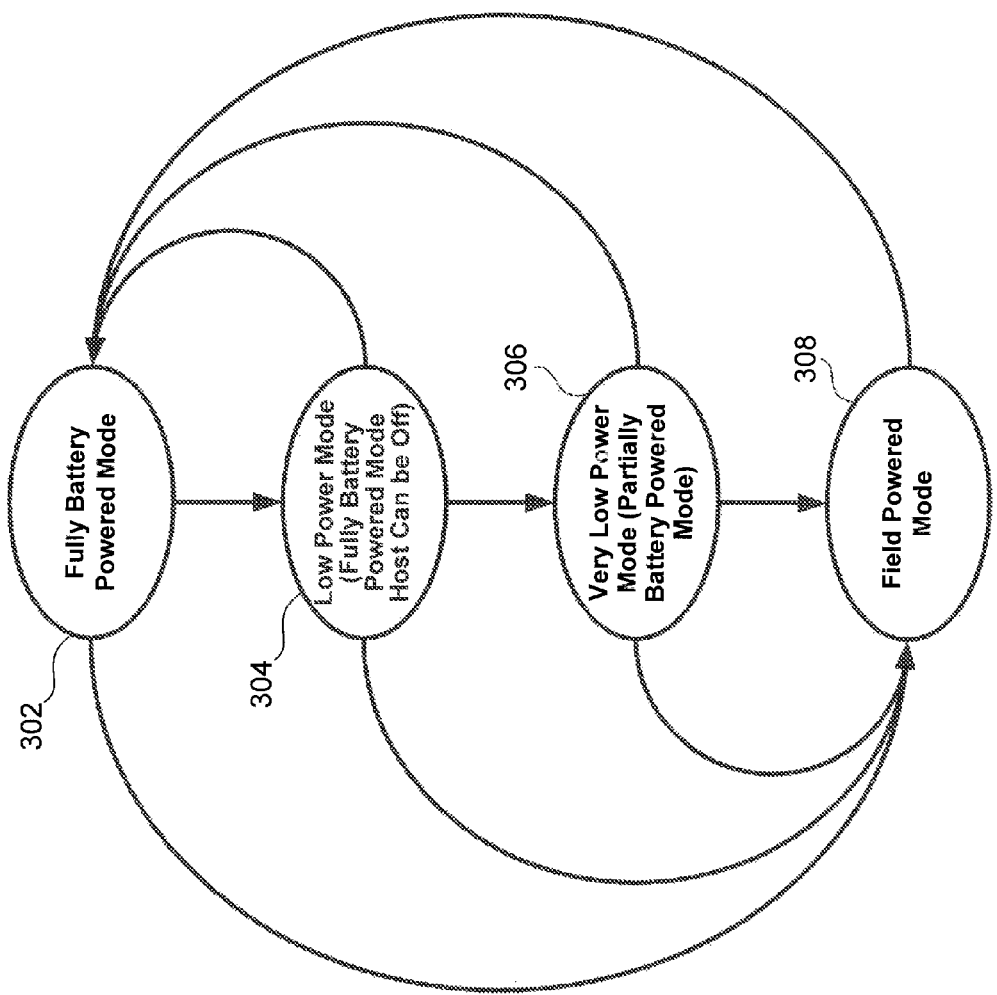
FIG. 3 is a power state diagram of the mobile communication device described herein.

FIG. 3 shows a diagram of the power states of the mobile device utilizing the power management features of this invention. State 302 represents a fully battery powered mode, where the mobile device is able to make and receive calls, "surf" the Internet, send and receive e-mails, etc. The NFC device or host 202 monitors battery power levels. When operating in fully battery powered mode, the NFC device can act as a reader or a tag. In this state, the NFC device can operate at a greater distance from an external reader or the reader can operate with less power than if the NFC device is operating only as a tag.

In one example, The NFC device in mobile device 200 is capable of operating as a reader and communicating with a tag. For example, a movie poster may have a NFC tag attached to it. When The NFC device in mobile device 200 is held in contact or close communication with the NFC tag on the poster, the tag will harvest power from The NFC device and communicate the information contained in the tag to mobile device host 202. Typically, this information could be in the form of a schedule of movie theaters and times; or the information could be in the form of an Internet address (or URL) to provide more information about the movie. If there is sufficient battery power available to permit access to the Internet, mobile device 200 may then be taken to the website associated with that URL. Alternatively, if there is insufficient battery power available to access the Internet, The NFC device can store the URL in local memory 210 or 212 in mobile device 200. The stored URL can then be accessed at a later time when more battery power has been restored (e.g., by recharging the battery or by replacing the discharged battery with a fully charged battery). In another non-limiting example, a tag could be attached to a bus stop sign and provide information about bus schedules and routes associated with that stop.

Over time, battery 208 loses power, through a combination of usage and leakage. At a certain point, when host CPU 202 (i.e., the "brains") of mobile device 200 determines that there is in insufficient power to support communications applications (e.g., voice, Internet, e-mail, etc.), it will shut off all communications functions. For example, below a predetermined battery power level, mobile device 200 typically will not be able to make or receive phone calls, send or receive e-mail and/or text messages and/or access the Internet. In this low power mode 304, battery 208 continues to provide power to the NFC device such that the NFC device can act as a tag in a card emulation mode. In this low power mode, the field need not be as strong as it must be in lower power modes and the NFC device can operate over a greater range than in the lower power modes.

The system has the ability to transition from one power mode to another after a fixed number of transactions, such as the number of phone calls made to or from the mobile device, the number of times the user accesses the Internet with the mobile device, the number of text messages sent or received by the mobile device, or any other type of suitable measuring transaction that would be apparent to one skilled in the relevant art. Alternatively, the system (CPU 202 or NFC device) can determine when to transition to a lower power mode as a function of the amount of time the mobile device has been "on" and drawing power (as the "on" time has a direct relationship to the amount of battery power that has been used), or as a function of a count of the number of bits that have been transferred between the NFC device and a reader (or tag).

As battery power further decreases, NFC controller 204 will instruct host CPU 202 to transition mobile device 200 to a very low power mode 306. In this mode, battery 208 provides enough power to maintain secure element ("keep alive memory") 212 active. The data in keep alive memory 212, called "personality data," is stored in secure element 212 and may include secure information and the types of credit cards for which mobile device 202 acts as a card emulation device. All other power to the NFC device is harvested from the field (i.e., supplied by a reader). The NFC device may act as a tag, and communicate with a reader to transmit (e.g., credit card) information to the reader. In this mode, battery 208 provides power to memory 212 to keep the memory "alive." All other functionality is provided by power harvested from the field. That is, the NFC device draws its power from the field generated by a reader. Usually battery 208 retains enough energy to power keep alive memory 212 for up to several days, allowing time for the user to recharge battery 208. The ability to use a secure element ("keep alive memory") 212 is of interest to mobile device manufacturers, since this type of device is less expensive than a non-volatile memory 210, thereby allowing manufacturers to reduce the cost of their devices.

If mobile device 200 contains non-volatile memory 210, there is no need to have secure element 212. In that case, there is also no need for mobile device 200 to use very low power mode 306. Non-volatile memory retains the secure "personality data" even when battery power has decreased to zero.

The last mode shown in FIG. 3 is a field power mode 308. In this mode, battery 208 is fully discharged or may even have been removed from mobile device 200. The NFC device acts as a tag and harvests all of its power from the field. Non-volatile memory 210 harvests power from the field through the NFC device in a known manner. If mobile device 200 does not contain non-volatile memory 210, it could not use field power mode 308. Since there is no battery power at all available in this mode, secure "personality data" would not be retained if only keep alive memory 212 were available. Absent non-volatile memory 210, secure data is only retained in secure element 212, which requires power at all times to retain data.

Figure 4:
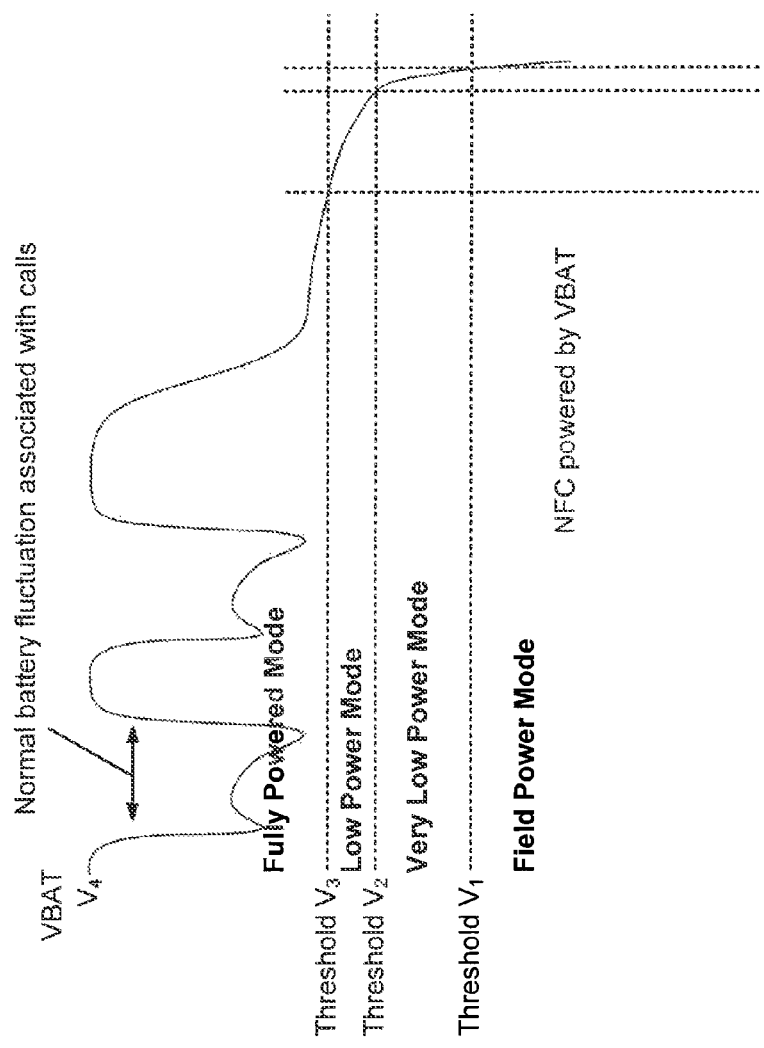
FIG. 4 is a chart of battery power over time.

FIG. 4 is a diagram of the power transition states against battery power. Battery power is shown as a plot 402. The fluctuation in power in the range between thresholds $V_4$ and $V_3$ is primarily a function of battery usage of mobile device 200 when making and receiving calls, when accessing the Internet, or when sending or receiving e-mails and/or text messages, and the like. The range between thresholds $V_4$ and $V_3$ shows the state in which there is sufficient battery power to make and receive calls. This is fully powered mode 302. At some point, battery power drops below the threshold necessary to maintain radio (i.e., phone and/or Internet) communications. Host CPU 202 then instructs the NFC device to enter low power mode 304. Below threshold $V_3$, host CPU 202 turns off the radio circuits in the mobile device and communications are disabled. Below threshold $V_3$, the NFC device operates only as a tag. Between thresholds $V_3$ and $V_2$, the system operates in low power mode 304. Below threshold $V_2$, mobile communication device 200 operates in very low power mode 306 if it contains keep alive memory 212. In this state, the battery provides only enough power to keep alive data in memory 212. Typically, battery 208 can maintain keep alive memory 212 active for up to several days, which should be long enough for the user to recharge the battery.

If mobile communication device 200 does not contain keep alive memory 212, but instead contains non-volatile memory 210, the operating range between thresholds $V_2$ and $V_1$ may be done away with, since non-volatile memory 210 does not require battery power to retain data stored in it. At any rate, below threshold $V_1$, no power at all is supplied by battery 208. At this point, battery 208 is either completely drained or has been removed. Below threshold $V_1$, mobile communication device 200 will operate only as a NFC tag. In this state, mobile communication device 200 must contain non-volatile memory 210 in order for it to act in card emulation mode. The NFC device must harvest all of its power from the field, including the power needed to access data stored in memory 210.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A method of controlling operation of a mobile communication device, the method comprising:
   measuring a power level of a battery;
   configuring a near field communication (NFC) capable device to operate as a reader or a tag when the measured power level of the battery is above a first predetermined level;
   configuring the NFC capable device to operate only as the tag when the measured power level of the battery falls below the first predetermined level; and
   configuring the NFC capable device to operate only as the tag, harvesting power for the NFC capable device from a magnetic field, and providing power to a memory to retain data stored in the memory when the measured power level of the battery falls below a second predetermined level lower than the first predetermined level.

2. The method of claim 1, further comprising:
   determining a number of transactions made with the mobile communication device; and
   transitioning from a first power mode to a second power mode as a function of the determined number of transactions.

3. The method of claim 1, further comprising:
   determining a length of time that the mobile communication device has been on; and transitioning from a first power mode to a second power mode as a function of the determined length of time.

4. The method of claim 1, further comprising:
determining a number of data bits that have been transferred between the NFC capable device and an external tag or reader during a given period of time; and
transitioning from a first power mode to a second power mode as a function of the determined number of data bits.

5. The method of claim 1, further comprising:
providing power to a radio to allow communication when the measured power level of the battery is above the first predetermined level; and
shutting off battery power to the radio when the measured power level of the battery falls below the first predetermined level.

6. A mobile communication device, comprising:
a central processing unit (CPU) configured to measure a power level of a battery; and
a near field communication (NFC) device, coupled to the CPU, configured to:
  operate as a reader or a tag when the power level of the battery is above a first predetermined level,
  operate only as the tag when the power level of the battery falls below the first predetermined level, and
  operate using power harvested from a magnetic field when the power level of the battery falls below a second predetermined level lower than the first predetermined level.

7. The mobile communication device of claim 6, wherein the NFC device is further configured to be transitioned from a first operating mode to a second operating mode as a function of a number of transactions made with the mobile communication device.

8. The mobile communication device of claim 6, wherein the NFC device is further configured to be transitioned from a first operating mode to a second operating mode as a function of a length of time that the mobile communication device has been on.

9. The mobile communication device of claim 6, wherein the NFC device is further configured to be transitioned from a first operating mode to a second operating mode as a function of a number of data bits that have been transferred between the NFC device and an external tag or reader during a given period of time.

10. The mobile communication device of claim 6, further comprising:
a radio, coupled to the CPU, configured to enable the mobile communication device to conduct wireless communications, the radio being further coupled to the battery to draw power from the battery when battery power is above the first predetermined level, wherein power to the radio is shut off when the battery power falls below the first predetermined level.

11. The mobile communication device of claim 6, further comprising:
a memory that draws power from the battery to retain data stored in the memory when the power level of the battery falls below the second predetermined level.

12. An article of manufacture including a non-transitory computer readable medium having computer program logic stored thereon that, when executed by a computing device, causes the computing device to perform operations in a mobile communication device, the operations comprising:
measuring a power level of a battery;
configuring the mobile communication device to operate as a reader or a tag when the measured power level of the battery is above a first predetermined level;
configuring the mobile communication device to operate only as the tag when the measured power level of the battery falls below the first predetermined level; and
configuring the mobile communication device to operate only as the tag, harvesting power for the mobile communication device from a magnetic field, and providing power to a memory to retain data stored in the memory when the measured power level of the battery falls below a second predetermined level lower than the first predetermined level.

13. The article of manufacture of claim 12, wherein the operations further comprise:
determining a number of transactions made with the mobile communication device, and
transitioning from a first power mode to a second power mode as a function of the determined number of transactions.

14. The article of manufacture of claim 12, wherein the operations further comprise:
determining a length of time that the mobile communication device has been on; and
transitioning from a first power mode to a second power mode as a function of the determined length of time.

15. The article of manufacture of claim 12, wherein the operations further comprise:
determining a number of data bits that have been transferred between the mobile communication device and an external tag or reader during a given period of time; and
transitioning from a first power mode to a second power mode as a function of the determined number of data bits.

16. The article of manufacture of claim 12, wherein the operations further comprise:
providing power to a radio to allow communication when the measured power level of the battery is above the first predetermined level; and
shutting off battery power to the radio when the measured power level of the battery falls below the first predetermined level.

* * * * *